Feb. 18, 1930.  W. T. BIRDSALL  1,747,155
SEPARATING APPARATUS AND METHOD
Original Filed Oct. 15, 1925   3 Sheets-Sheet 1
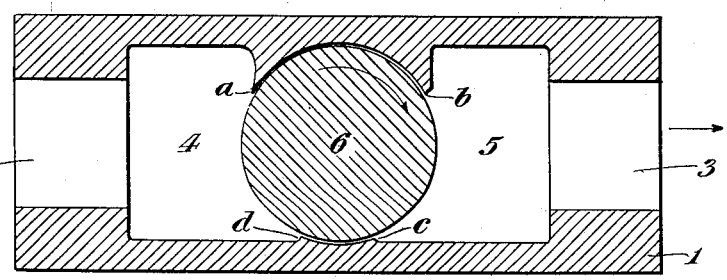
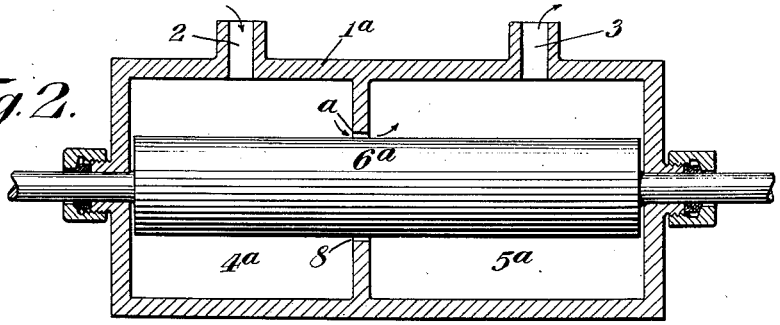
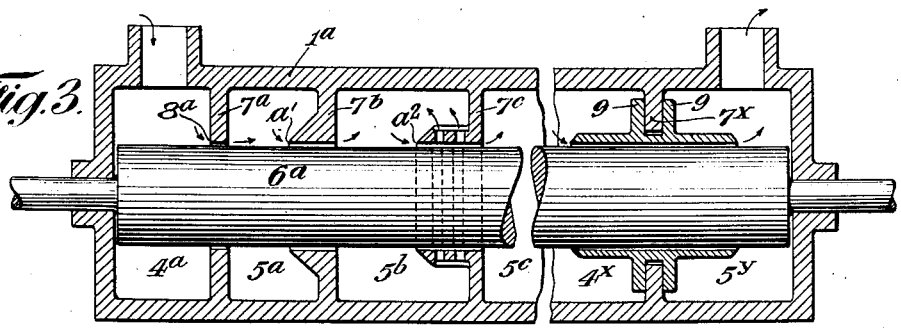
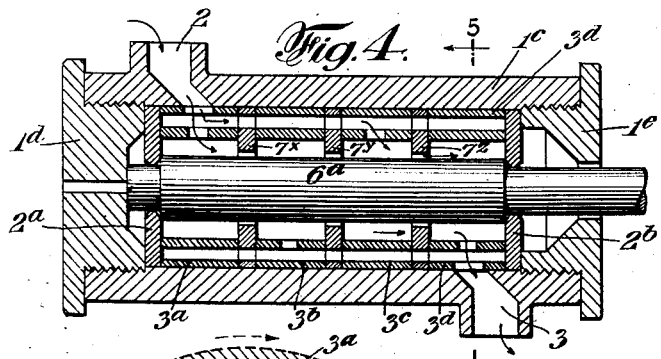
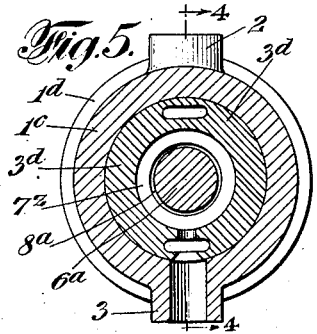
Inventor
Willfred T. Birdsall
By his Attorney Feb. 18, 1930. W. T. BIRDSALL 1,747,155
SEPARATING APPARATUS AND METHOD
Original Filed Oct. 15, 1925   3 Sheets-Sheet 2
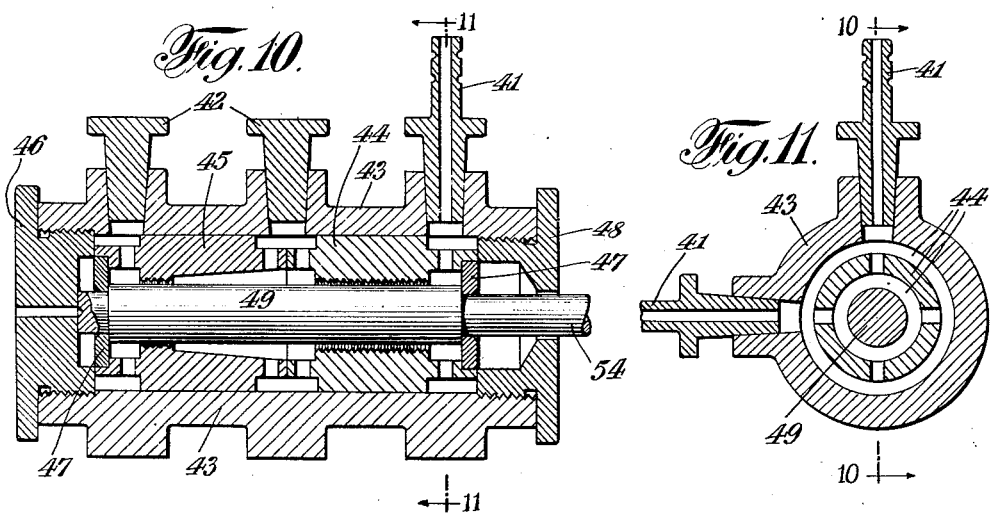
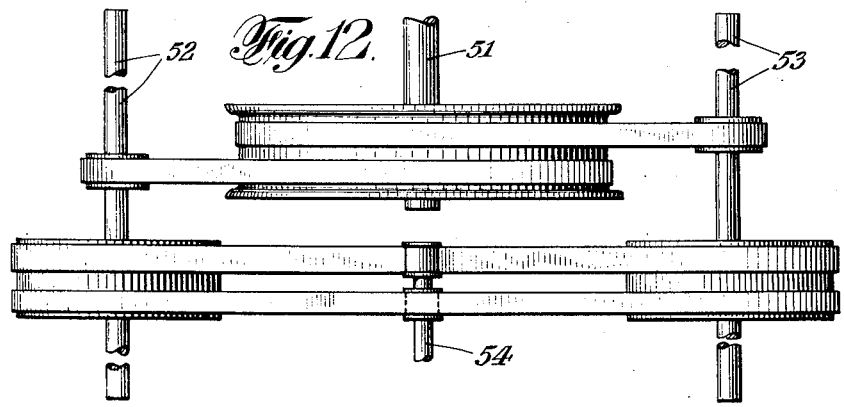
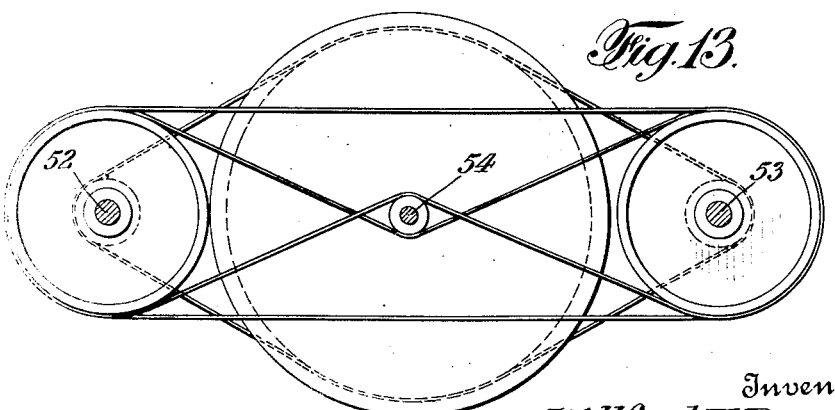
Inventor
Willfred T. Birdsall
By his Attorney Feb. 18, 1930. W. T. BIRDSALL 1,747,155
SEPARATING APPARATUS AND METHOD
Original Filed Oct. 15, 1925  3 Sheets-Sheet 3
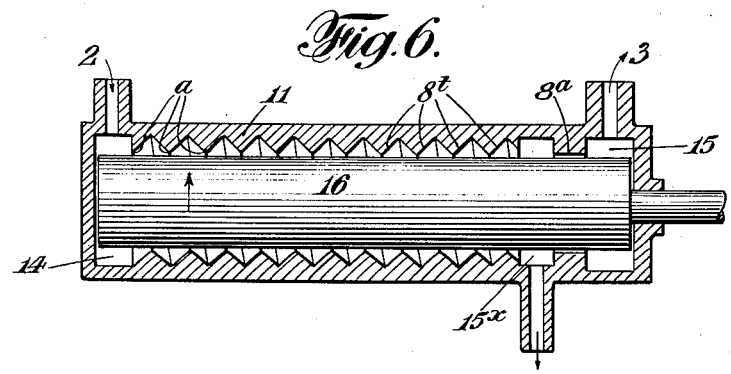
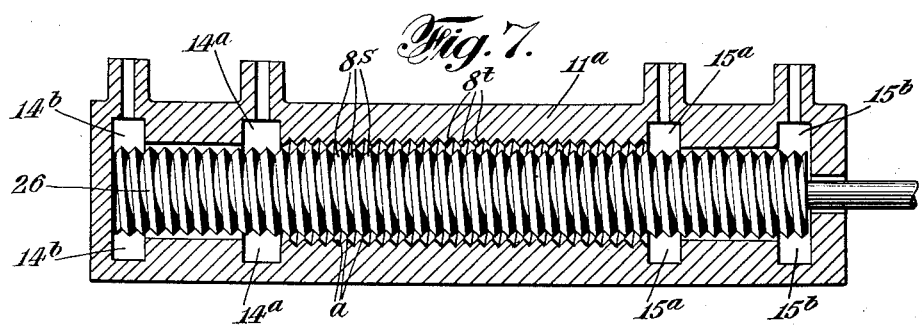
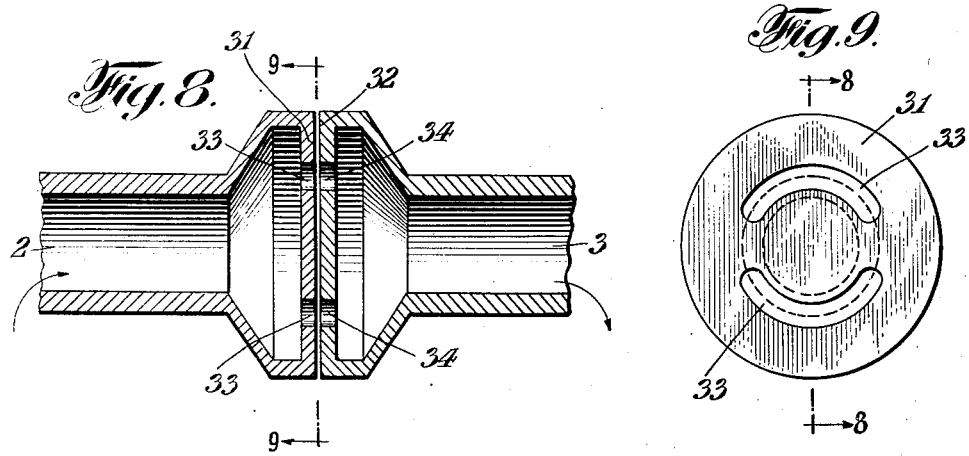
Inventor
Willfred T. Birdsall
By his Attorney Patented Feb. 18, 1930

1,747,155

UNITED STATES PATENT OFFICE

WILFRED T. BIRDSALL, OF MONTCLAIR, NEW JERSEY

SEPARATING APPARATUS AND METHOD

Application filed October 15, 1925, Serial No. 62,534. Renewed June 25, 1929.

My present invention is shown as embodied in apparatus primarily designed for separating liquids from solids, but most of the forms shown are also adapted for separation of liquids of different specific gravities, and some of them for separation of gases from solids or from liquids or from other gases of different density. The separation may be made by withdrawing the lightest constituent from a body of the mixture or by withdrawing the heaviest constituents, or both actions may be combined. In so far as centrifugal force is a factor, the power may take effect from within to localize or accentuate its effect for inward segregation or concentration of the lightest constituent, or it may take effect from the periphery for outward concentration of the heaviest constituent, or both effects may be produced simultaneously and in greater or less degrees.

Important features of my invention are the new principles I have utilized to bring into play and highly localize differential or separating forces so that they are of enormously greater effect than any that have heretofore been available; also the simplicity, small size, and great capacity of the mechanical means utilizing said principles.

A unique practical feature of my invention, is the attainment of the high differential or separating pressures by means operating naturally and easily to remove solids in continuous process, as fast as separated, thus rendering it unnecessary to stop the filter for cleaning purposes.

As concerns the centrifugal factor of separation and the corresponding rate at which filterings or other separations may be effected, the improvements are so great as to constitute a new order of magnitude as compared with the known art. For instance, in present commercial practice, centrifugal pressures equal to 5,000 to 10,000 times gravity are considered high, and the highest limit for specialized apparatus with which I am familiar, is about 15,000 times gravity; whereas by my invention, the centrifugal pressures may be 100,000 to 200,000 times gravity, and even greater if desired.

Moreover, the specialized apparatus referred to requires very high speeds of the order of 30,000 revolutions per minute, whereas in certain preferred forms of my device a rotor of practically the same diameter, driven at half the speed, would do better work in much less time. I cite this as illustrative of the fact that the novelty and efficiency of my apparatus is independent of its possibilities as concerns high centrifugal pressures, and that a feature of equal or greater importance is the employment of a new method involving phenomena never before employed in such a connection. In this method, distinct factors are observable which are preferably employed in novel combinations, but which are capable of separate utilization. These may be better understood from the following:

A primary fact, observation and study of which was one of the steps leading to the invention or discovery of my present method is, that a smooth knife blade when immersed in and then withdrawn from a kettle of melted fat containing solid matter was found to have a thin film of the fat adhering to the blade and said film contained practically none of the solid matter. A careful analysis of the causes made it evident that this could only happen with a liquid that adheres to, that is, wets, the smooth surface, and experiments show that it can only happen when the fat is sufficiently fluid to make the film a very thin one. Further experiments made it evident that the actual filtering or scraping back of the solid matter is due to the surface tension localized in the meniscus of the liquid acting as an automatic, self-gaging scraper sweeping back the solid matter and excess liquid, as the blade is withdrawn from the fat. While I have actually made a machine that will filter fat in commercial quantities by such a method, the preferred forms shown herein involve the substitution of mechanical scrapers to gage the adherent film and to sweep back the solid particles. This makes it possible to operate by means of a rotary surface submerged in the liquid mixture to be filtered and when so submerged, the phenomena are made independent of whether the fluid wets the rotary surface or not.

Using a rotor as the film adherent surface introduces two new factors of the method. The first of these is the sweeping, or, as I prefer to call it, shearing, action of the relatively stationary body or mass of the liquid with respect to the adherent film which moves at substantially the same speed as the rotor. It will be evident that under ordinary conditions a rotor, particularly a high speed rotor such as I prefer to use, will tend to act as an efficient mixer rather than as a separator for the liquid in which it is submerged. Apparatus operating in this way is in common use for mixing soft drinks and the like.

I avoid mixing and produce separation by utilizing certain physical phenomena that depend upon the viscosity of the fluid under treatment.

In this connection a basic fact is that fluids flowing in contact with and relative to a smooth surface do not slip appreciably, those particles of the fluid in immediate contact with the surface being substantially stationary relative to the surface, so that there is a shearing action in the fluid at and near the surface.

A second fact is that the rate of shear in the fluid must exceed a certain critical amount under any given conditions before eddies are produced and the fluid becomes mixed thereby. This is best understood by considering the case of fluid flowing between surfaces along parallel lines, as in a straight pipe of uniform diameter. Below a certain critical velocity, there will be a regular variation in the velocity of the fluid from the inside surface of the pipe, where the fluid will be practically at rest with respect to the pipe, to some point near the center, where the fluid will flow fastest. The successive layers or laminæ of fluid parallel with the pipe surface will each flow with characteristic velocity, and will slip or shear smoothly relative to adjacent laminæ, without causing eddies. When this condition exists, the only resistance to flow is found in the smooth slipping or shearing between the faster and slower moving layers of the viscous fluid, and the energy consumed is directly proportional to the velocity. But if the velocity of flow is increased beyond a certain critical value, eddies are formed and the fluid is continuously mixed with itself. Under such conditions the energy consumed is proportional to the square of the velocity, as in the ordinary case of the flow of water in large pipes. It has been well established both by theory and experiment that the critical velocity at which smooth shearing flow ceases and eddies begin to form increases proportionally to the viscosity of the fluid, inversely as its density, and inversely with the diameter of the pipe. It is possible, therefore, to obtain relatively enormous velocities in small pipes or passages, without forming eddies and destroying the linear character of the flow.

I have discovered and utilized the fact that follows logically from the above, namely, that a thin layer of fluid in immediate contact with the solid surface, is not agitated or subjected to the mixing action of eddies in the adjacent fluid. Furthermore, this thin layer of fluid may be dragged by the surface with which it is in contact, against tremendous restraining forces, and fluid can be dragged in this way into a region where the pressure is hundreds of pounds per square inch higher than at the starting point.

From the above it will be evident that when I employ a smooth shaft revolving in a container filled with fluid, such as oil or water, its surface is covered by a thin film of fluid moving at substantially the same speed as the shaft surface. This film is in turn surrounded by outer films, each moving somewhat slower than the one nearer the shaft. If the shaft is closely surrounded by the casing, so that shaft and casing are equidistant at all points of a circumference, the surface of the shaft may revolve at peripheral speeds of several hundred feet per second before the laminæ are mixed. If the casing is comparatively large, there will usually be eddies in the liquid about the shaft, but practically none in immediate contact with it. In either case there is a thin layer of fluid in contact with the rotor which is not continuously mixed with the remainder of the fluid, and which is subjected to the sweeping shearing action of adjacent differently moving portions of the fluid.

Another contributory fact is that this inner layer is subjected to centrifugal force which in the case of a high speed rotor will be very great.

Hence the radial thickness of the unmixed film depends on many factors, such as viscosity, density, speed of rotation, nature of rotor surface, and the radial depth of fluid outside the rotor, but in practice with fluids such as oil or water, it is a very small fraction of an inch, and sometimes only a few thousandths. Outside of this film there is always the additional fluid, which may be stationary or moving and may or may not be filled with eddies, but which in any event has differential movement and slip relative to the revolving shaft.

My apparatus is designed to utilize these facts. In its simplest form, it consists of a smooth rotating shaft, within a stationary casing, arranged to permit the fluid to be treated to flow between these two members, and come in contact with the shaft, so that the shaft is surrounded by a thin skin or film of fluid that is substantially free from eddies, which film is in turn in contact with surrounding fluid which slips relative to the shaft.

This will concentrate the segregating effect upon the lightest constituent and in a radially thin layer adjacent the surface of the shaft. If the casing is the cylindrical rotor and the shaft is stationary, the segregating effect will concentrate on the heaviest constituent and in the layer adjacent the casing. If both rotate in opposite directions, both effects would occur simultaneously.

Obviously many different arrangements may be incorporated for drawing off the segregated fluid or fluids and for controlling the flow of the fluid. But in every embodiment there are four factors, namely: (a) a moving surface, preferably a rotor, (b) a casing to hold the fluid around the rotor, (c) a portion of the fluid close to the rotor moving substantially without slip relative to the rotor, so that it is subjected to centrifugal force, and which is substantially free from any internal movement except shear parallel with the rotor surface, (d) a portion of the fluid which slips relative to the rotor, but is in contact with the fluid moving with the rotor, and which may or may not be subject to the mixing action of eddies.

The above and other features of my invention may be more fully understood from the following description in connection with the accompanying drawings, in which Fig. 1 is a section at right angles to the axis of the rotor, illustrating one embodiment of my invention;

Fig. 2 is a similar view in a plane passing through the axis of the rotor, the casing being shown in section and the rotor in side elevaton;

Fig. 3 is a view like Fig. 2 but showing a third form;

Fig. 4 is a view like Fig. 2, but showing a fourth form;

Fig. 5 is a section on the line 5—5, Fig. 4;

Fig. 5ª is a greatly enlarged diagrammatic view illustrative of certain features of the method;

Fig. 6 is a view like Fig. 2, but showing a fifth form;

Fig. 7 is a view like Fig. 2, but showing a sixth form;

Fig. 8 is a view like Fig. 2, but showing a seventh form;

Fig. 9 is a view taken transversely of Fig. 8 on the line 9—9 looking in the direction of the arrow;

Fig. 10 is a view like Fig. 2, but showing an eighth form;

Fig. 11 is a transverse section on the line 11—11, Fig. 10;

Fig. 12 is a plan view of driving mechanism that may be used for the rotors of any of the foregoing forms; and Fig. 13 shows the same driving mechanism viewed endwise of the shaft.

In Fig. 1 the casing, 1, is adapted to be supplied with fluid to be filtered through the opening, 2, and the latter or filtered out fluid is discharged through the outlet, 3. The casing is divided into two chambers, 4, 5, by the rotor, 6, which rotates in the direction indicated by the arrow, about an axis perpendicular to the plane of the paper, the casing conforms to and fits the periphery of the rotor with but small clearance around the longer arc, a—b, and the shorter arc, c—d.

The rotor, 6, may be, say, 1.5 inches diameter and revolve at, say, 5,000 revolutions per minute, and the clearance between the rotor and the casing may be of the order of .002 inch. The long arc, a—b, may cover 120 degrees of rotor circumference and the small arc, c—d, may cover only fifteen degrees. These dimensions may vary enormously in practice.

In operation, the surface of the rotor, 6, contacting with the fluid, entrains a film or layer of the fluid from the chamber, 4, and carries it under the long arc, a—b, into the discharge chamber, 5. Some fluid is similarly carried from the chamber, 5, back to chamber 6, by way of the small arc at c—d. In this operation the edge, a, operates as a scraping gage, for all fluid and solid matter outside the .002 inch layer on the surface of rotor 6.

In practice, considerable pressure is developed between the arcs of the casing and the rotor, which may amount to several hundred pounds per square inch. The pressure developed per unit area is the same or nearly so in both the short and long arc, but the larger area of the long arc, a—b, produces a much larger total force against the rotor and there is a normal tendency for the rotor to be closer to the arc c—d than to the arc a—b. Consequently more liquid will be carried into 5 than is returned to 4. In practice this occurs as soon as rotation starts. The same result can be achieved much less conveniently by mounting the rotor in rigid bearings and forcing an adjustable scraper against the rotor at the top and bottom, but this arrangement is hard to make and difficult to keep accurately adjusted.

The centrifugal force is greatest in the innermost layer that contacts with the peripheral surface of the rotor and is progressively less in the successive layers or films, measured outwardly from said surface. Consequently, the centrifugal force is concentrated and produces maximum separating or differential pressures in the thin layers nearest the axis of rotation, and it is the effective separation in this region that is utilized in the apparatus.

Particles that are solid or in the nature of a solid cannot enter this film because they can only approach it by moving from a layer of greater radius and less peripheral speed to a layer of less radius and greater peripheral speed. In preventing such movement, there is not only centrifugal force but also the above described shearing action of the liquid. The higher speed layer impinging on the inwardly presented face of the particle, tends to rotate the latter about an axis parallel with the rotor, like a pinion meshing with a gear wheel, but the inertia of the particle, whatever its weight or specific gravity, tends to resist such rotation tending to produce an outward rebound, in addition to the tangential or outward centrifugal force. Consequently, inwardly moving portions of eddies, when eddies are produced, can have no effect in contaminating the inner film or layer after it has been purified by the centrifugal action.

A better analogy than the gear wheel is the action of a tennis ball when thrown against a high velocity jet of water. Even if the ball is thrown at a very acute angle in the direction the jet is moving, it will rebound at a much greater angle than the angle of incidence. This is because the rebounding angle is not, strictly speaking, an angle of reflection, but rather an angle of dynamic reaction between the inertia of the ball tending to resist rotation and impingement of the jet tending to produce such rotation.

A moment's consideration will show that this shearing reaction on the solid particle in the liquid of my apparatus necessarily works both ways, that is to say, the inertia of the solid particle causes it to tend to resist movement from the higher speed layers outward into the lower speed layers, but the effect of the centrifugal force at the surface of the rotor is great enough to easily force the particle out of the inner layer notwithstanding such dynamic reaction tending to resist the expulsion. Therefore, in the centrifugal forms, the importance of the shearing reaction is its relative effectiveness as compared with anything the relatively slow moving eddies can do in the direction of forcing the particle back into the faster moving layer or layers from which it has been expelled.

The whole action of the shearing film may be summarized by saying that effects due to impact, localized hydrostatic pressures, and the shearing which necessarily occurs around a solid particle, all tend to prevent a solid particle from entering the film, or after entering from passing through a shearing surface. It is clear that this discussion applies to the shearing film, however produced, whether in the above apparatus or in the apparatus of Fig. 8, described below as operating on the shearing principle with centrifugal force present only as a negligible factor. It also obviously applies when, instead of the solid particle, a small mass of immiscible fluid floats in the carrying fluid, as in the case of emulsions. It also applies when the carrying fluid is a gas, and also, though not in every respect, to the action of the shearing film upon mixtures of fluids, either gaseous or liquid, which differ in density or viscosity.

This apparatus, as described, is obviously in the nature of a pump and is suitable for removing from suspended matter, fluids of less density than the suspension. In operation it is found that the film close to the rotor is almost instantly freed from suspension by centrifugal force and thereafter no dense particles can come close enough to the rotor to pass beneath the casing in the arc $a-b$. Consequently, an efficient filter is provided. It is suitable for use, however, only where centrifugal separation is so easy it can be accomplished in a fraction of one turn of the rotor.

In Fig. 2 I have shown precisely the same principles applied in such a way that the fluid can be subjected to the separating action during as many revolutions of the rotor as may be desired. In this form a rotor, $6^a$, revolves in a casing, $1^a$, which is shown in section parallel to and through the axis of the rotor. The casing is divided transversely of the rotor into an inlet chamber, $4^a$, and an outlet chamber, $5^a$, by the transverse partition, 7. This partition has a cylindrical opening, 8, that fits quite closely around the entire circumference of the rotor, $6^a$. The radial dimensions of the annular passage, 8, between the rotor and partition depend upon the fluid to be treated and the conditions of operation, particularly the speed of the rotor and the velocity of the fluid through the annular passage. In any case, this dimension should be small compared with the somewhat indefinite radial dimension of the fast moving film contacting with the rotor. If the rotor is 1.5 inches diameter, rotating at 5,000 R. P. M., and the fluid is heavy oil, the radial width of the annular passage may be of the order of .002 to .100 inch. Obviously, the rotor may be of any diameter and may rotate at any speed which is mechanically practical, and wide variations in dimensions may be made to suit special conditions without affecting the performance of the device. It is found that centrifugal force quickly clears the fluid close to the rotor of denser matter, and that thereafter none can approach close enough to the rotor to pass through the partition into the discharge chamber, $h$.

This form differs from that of Fig. 1 in that the rotor does not operate as a pump to force the fluid from inlet chamber, $4^a$, into chamber $5^a$. This permits driving or sucking the fluid through by external pressure, as slowly as may be desired, thus subjecting the film to the separating action for as many revolutions as may be desired before and during its passage through annulus 8.

This form is also more effective than the preceding type because the partition edge, $a$, is more in the nature of a gage determining the thickness of the film that flows into $5^a$. It has less effect than the scraper edge, $a$, Fig. 1, in impeding the rotation of the film on the rotor.

As shown in Fig. 3, effectiveness of the gage type of Fig. 2 may be increased by placing several stages in series on the same roller. In this form the casing, $1^a$, and rotor, $6^a$, may be the same as in Fig. 2, but there are a plurality of successive transverse partitions, as $7^a$, $7^b$, $7^c$, so that the material filtered from the inlet chamber $4^a$, into the second chamber, $5^a$, becomes the inlet supply for filtrate passing into the third chamber, $5^b$, and the latter in turn the supply chamber for filtrate passing into chamber $5^c$, etc. In this figure, I have taken occasion to illustrate how the gage edge, $a'$, of partition $7^b$ may be beveled rearwardly to assist flow of liquid away from the entrance to the passage between chambers $5^a$ and $5^b$; also in connection with partitions $7^c$, I have shown how radial clearing passages may be arranged to permit discharge of the heavier outer parts of the film during its passage through the long pass between $5^b$ and $5^c$.

I have also shown how this pass for the film, to any outlet chamber $5^y$, from any inlet chamber, $4^x$, may be elongated to any desired extent.

This figure also illustrates how the film outlet passage for any partition as $7^x$ may be made floating and self centering with respect to the shaft by providing it with mounting flanges, 9—9, embracing the partition $7^x$. Obviously the partitions may be formed in other ways to increase their efficiency or to cut down their impeding effect upon the rotating fluid.

As shown in Fig. 4, this same type of separator may be designed for large capacity and small dimensions by using a large number of partitions on a single rotor shaft, the chambers having separate inlets and outlets connected in parallel. This figure also illustrates a simple construction adapted to be built up of standardized similar parts. The casing, $1^c$, may be as long as desired. The ends may be closed by screw plugs, $1^d$, $1^e$. Between these plugs are clamped simple cylindrical elements capable of forming as many inlet and outlet chambers as may be desired. There may be two end closing washers, $2^a$, $2^b$, in which the rotor $6^a$ is journaled. As shown, the rotor is of slightly greater diameter than its journal, so as to form shoulders at either end, rotating in close proximity to the inner faces of the bearing washers, $2^a$, $2^b$. With this arrangement the journals require no packing because centrifugal force will prevent any liquid from flowing radially inward to escape through the bearing. The bearing washers may be thin enough so that the screw plugs, $1^d$, $1^e$, will cause them to have spring pressure against the said radial shoulders on the rotor.

Between these end pieces are four cylindrical casing units, $3^a$, $3^b$, $3^c$ and $3^d$, which are all identical except that the end units $3^a$ and $3^d$ have exterior openings to register with inlet 2 or outlet 3. Each of these units is simply a cylinder with two diametrically opposite longitudinal holes brought into registry in the plane of Fig. 4. Either unit may be rotated through an angle of 180° to make its radial passages, inlet or outlet, as may be desired.

The three partitions, $7^x$, $7^y$ and $7^z$, are merely cylindrical discs with cylindrical holes of the desired diameter, at the center to serve as film gages for the shaft, and near the periphery to afford inlet and outlet passages registering with corresponding passages in the above described casing section.

Fluid entering at 2 can flow into the first and third chambers while the second and fourth chambers are connected in parallel for discharge through the outlet 3.

The distributing passages in the outlet casing unit, $3^d$, are clearly shown in cross-sectional view, Fig. 5.

In Fig. $5^a$, I have attempted to indicate diagrammatically how the liquid between the outer surface of the shaft, $6^a$, and the inner surface of the stationary casing, $3^a$, has zero velocity for the film in contact with $3^a$ and increasing velocities up to a maximum, $x$, for the innermost film in contact with the surface of $6^a$. Obviously, a gage passage that only admits the film or layer of fastest moving liquid below the line $x$—$x$ will pass only the lightest, purest, fastest moving part of the liquid.

This diagram also assists in the understanding that where only the shaft rotates, there is no localized separation of the heavy particles on the inside of the casing at $o$—$o$. Consequently, there is no caking of solid matter until the filtration has proceeded to a point where there is no liquid content sufficient to permit flow of the remnant, even though the solid be approximately uniformly distributed in the remnant fluid.

Fig. $5^a$ also makes it obvious that if the casing, $3^a$, were rotating in the opposite direction, there would be a concentration of solids against inner surface of $3^a$, regardless of the amount of remnant liquid which would be available to wash it out, were it not for such concentration with its resulting caking tendency. Obviously, also, the localizing of the effects on the surfaces of $6^a$ and $3^a$ may be brought about, either one separately, or in various degrees of combination.

As before explained, an important difference between the type of Fig. 1, with the gage or scraper parallel to the axis of the rotor, and the type of Figs. 2, 3, 4, with the gage perpendicular to the axis of the rotor, is that the first type acts as a pump, because the fluid adhering to the rotor is dragged through the filtering passage. When either one of these devices is used to separate solid matter from a fluid, the solids may in time accumulate at the entrance of the filtering passage and in time clog the passage or even jam the rotor and prevent its turning.

The accumulation of residue in this manner may be prevented while at the same time preserving the advantages of the gage type of Figs. 2, 3 and 4 and adding a self pumping feature analogous to that of Fig. 1. As shown in Fig. 6, this may be accomplished by arranging the gage-scraper element so that the operative edge adjacent the cylindrical surface of the rotor is in the form of a helix. That is, the gage edge is neither parallel nor perpendicular to the axis of the rotor, but between these two positions; and preferably the helix has a large number of turns so that it affords a long continued and multiplied gage effect. Such arrangement is shown in Fig. 6, where rotor 16 is surrounded by the casing 11, having the usual inlet chamber as 14 and the discharge chamber as 15, together with intermediate outlet chamber as $15^x$. An internal thread $8^t$ is cut on the inside of the casing 11, between 14 and $15^x$, and the "lands" of the thread serve as a continuous spiral gage or scraper around and along the rotor 16. The direction in which the rotor turns is such as to drag fluid along this thread from 14 to $15^x$, thereby producing a certain amount of pressure at $15^x$. Accumulations of residue in the thread are continuously washed along until they reach $15^x$, where they are continuously discharged. During the time fluid containing residue is passing from 14 to $15^x$, the film close to the rotor is subject to centrifugal force, so that at $15^x$ all the residue is at a considerable distance from the rotor surface, and the fluid passing gage edge, $a$, and passing through passage $8^a$ into outlet chamber 15 is free from residue and consequently cannot produce any clogging. In this way the pressure at $15^x$ serves to force clarified fluid out at 15, while the preliminary gages or scrapers formed by the "lands" of the thread, are continuously washed free of residue so no clogging can take place.

A more generalized form of apparatus is shown in Fig. 7, in which 26 is a rotor having a shallow continuous thread, $8^a$, cut on its surface, and the casing has an internal thread, $8^t$, between the inlet $14^a$ and the outlet $15^a$. In other forms the thread on the rotor may extend only part of its length, and the thread in the casing may extend for its entire length. In still other form, the threads on either rotor or casing may be separated into two or more portions by regions having no thread, and the different threads on either member may be cut in either the same or opposite senses, so that they feed in opposite or like directions along the axis.

However, the specific form of Fig. 7 illustrates an embodiment capable of utilizing all of the phenomena characteristic of my method. It embodies the two characteristic mechanical members, namely, the rotor 26, and the casing or container $11^a$. When filled with fluid, the fluid is obviously separated into the two characteristic regions,—namely, (a) the region close to the rotor, on its surface and in its thread, where the fluid rotates substantially as fast as the rotor and is subject to no disturbing or mixing eddies, and (b) the region outside of this, in the thread of the inner surface of the casing, where the fluid slips appreciably with respect to the rotor. The thread in the casing forms the characteristic gage or scraper edge, $a$, which is self cleaning, and either or both threads may be cut in such a direction as to pump fluid through the apparatus. In this generalized form, also, each of the characteristic regions in the fluid have separate inlets and outlets, that in contact with the rotor having an inlet at $14^b$ and an outlet at $15^b$, while the other region has inlet and outlet respectively at $14^a$ and $15^a$. Characteristically, also, the two regions of the fluid are in immediate and free contact with each other, and if the apparatus is properly designed for the fluid to be treated and the actual operating speed, the fluid in the two regions will not become mixed, but one portion will slide or shear smoothly on the other without formation of eddies.

The fluid to be treated may be supplied through inlet $14^a$ and removed through outlet $15^b$, while a fluid for treating it, is supplied through $14^b$ and removed through $15^a$, or vice versa, according to their relative specific gravities.

In a special case the rotor may be 1.5 inches diameter, and six inches long. The radial clearance between the rotor and the case, before the threads are cut may be about .002 inch, and the threads may be ordinary screw threads of usual form, about twenty to the inch, either single or multiple threads being used. Investigation has shown that the rotor may be a foot or more in diameter and ten feet or more in length, and the clearances and pitch of the thread adjusted to the speed of rotation so that capacities of a hundred thousand gallons per day or more may be secured without impairing the characteristic functioning of the apparatus. The exact dimensions are of course largely a matter of experiment for any given fluid or operating speed. Furthermore, various elements of the device may be omitted or duplicated. For instance, an auxiliary outlet midway between $14^a$ and $15^a$ in Fig. 7 may be desirable. In all these cases it may be desirable to rotate the casing and rotor in opposite directions, or to rotate the casing about a stationary central member, as explained in connection with the diagram, Fig. $5^a$.

It is a characteristic of this apparatus when operated with a stationary casing and rotating central member, that residue thrown out of the region close to the rotor is no longer subject to strong centrifugal force, and consequently does not form hard compact deposits in the apparatus characteristic of other forms of centrifuge. Consequently, my apparatus can be made self cleaning, whereas no other form of centrifuge known to me can be operated indefinitely without stopping to clean out deposits of separated residue.

Another characteristic difference between my apparatus and ordinary centrifugals is that the radial depth of fluid subject to centrifugal force is characteristically small. In ordinary centrifugals the pressure developed by centrifugal force in a radial column of rotating fluid in the apparatus may be and usually is much greater than the absolute pressure on the fluid, so that the fluid flows to the perimeter of the apparatus and leaves an empty space in the center. If in such apparatus the radial depth of fluid is six inches, and the barometric column is, say, thirty feet, then if the apparatus develops a centrifugal force sixty times gravity, the fluid will actually cavitate and form a vacuum in the center if air or additional fluid is not supplied to fill the space. But in my apparatus the radial depth of fluid subject to centrifugal force may be, say, only .020 inch or one fiftieth of an inch and a centrifugal head of 18,000 times gravity can be used before a cavity will be formed next to the rotor. By using a rotor which is either smooth or covered with very shallow threads, it is possible to design apparatus which will develop centrifugal force of 50,000 or 100,000 times gravity without danger of the fluid leaving the surface of the rotor. Furthermore, my apparatus is self regulating in this respect, however fast the rotor may be driven, because, especially in the case of a smooth rotor, the slower moving laminæ of fluid around the rotor but not in contact therewith, immediately slow up fluid thrown out of contact with the driving surface, and thereby immediately produce a compensating pressure. It is a matter of experimental observation well supported by theory that it is impossible to drive a smooth shaft so fast that fluid surrounding it will not come in contact with it. This always holds true with liquid materials with central rotor and external stationary casing. When gases are under treatment, it is not necessarily true when the distance between rotor and casing is comparable with the mean free path of the gas molecules. In this case, the apparatus approaches Langmuir's molecular pump in form (and also in functioning, as a pump). When the rotor is external, or when rotor and case turn in opposite directions, the total centrifugal pressure may be any figure above or below the absolute pressure, which the apparatus will withstand. The absolute pressure on the apparatus is thus sometimes of importance, and should be under control.

For handling gases or solids and gases, it is not strictly necessary that the distance between moving and stationary member be so small that eddies are not formed in the fluid under treatment, because the separation accomplished in the machine is gradual, and also because eddies in the main mass of fluid do not approach close to either of the surfaces, between which they occur. Nevertheless, it is obviously desirable to make the passage so small, or hold the velocity to such a low value, that the critical point where eddies are formed is not exceeded. The best data available, for water, between a fixed plate parallel with a moving plate, shows the moving plate can attain the following velocities before exceeding the critical point and forming eddies in the water.

| Inches between plates | Veloc. moving plate in feet per sec. |
|---|---|
| 1.000,000 | 2.96 |
| .250,000 | 9.60 |
| .020,000 | 82.40 |
| .005,000 | 267.44 |
| .001,000 | 1048. |
| .000,500 | 1896. |

Since the critical velocity for fluids other than water is greater in proportion to viscosity, and less in proportion to density, and since the ratio of viscosity to density in ordinary gases at atmospheric pressure varies only a few hundred per cent from the same ratio for water, the critical velocity in the above table may be corrected for use with any other gas or liquid fluid, without greatly changing the ultimate design of the apparatus. In fact, apparatus which will separate gases by centrifugal force (an entirely new process) will have closely the same dimensions as the actual design shown in Figures 10 and 11, and may have the same identical dimensions if the pressure of the gas is subject to control. It is obvious that the separation of solids from gases, due to the great difference in density, is easily carried out in my apparatus. The effectiveness of apparatus in common use for cleaning intake air for automobile motors by deflecting the fast moving air, indicates that the centrifugal force necessary for this purpose is relatively small.

Returning again to the case of liquids, it will be noted that if the rotor has projecting fins, as where the thread on 26, Fig. 7, is quite deep, it is theoretically possible to produce cavitation and thus free the roots of the thread of fluid, by centrifugal force. In such case, a few pounds increase of the static pressure on the fluid in the machine will prevent the cavitation. In the ordinary centrifugal this would require enormous pressures, and require increasing the strength of the rotating parts beyond current practice, which is already limited by the strength of available materials. In my apparatus much of the fluid is not turning as fast as the fluid in immediate contact with the rotor and consequently much higher rotational speeds are possible before a given centrifugal head is developed in a given radial column of fluid. It can be said, therefore, that while my apparatus allows the development of centrifugal force in the fluid several times as great as is practical with ordinary and usual apparatus, it is characteristic of the apparatus that the total centrifugal head developed in any radial column of fluid does not exceed the absolute pressure upon the fluid in the column.

It is not necessary that the material to be removed from a fluid be more dense than the fluid desired at the discharge. Consideration will show that the threads in casing and rotor may be cut in such a manner as to return the lighter materials to the supply and discharge the heavier portions. Obviously, also separation can be accomplished between either liquid or gaseous fluids and between fluids and entrained solids, it being merely necessary to design the apparatus to suit the viscosity of the particular fluid under treatment, so that the apparatus functions as a separator rather than a mixer, in accord with the natural phenomena described above.

While ordinary centrifugals will separate two fluids of different densities, more or less completely, by providing discharge passages for both heavier and lighter constituents, and throttling one of the outlets, it is a matter of great mechanical difficulty to provide more than two outlets. Reference to Fig. 7, shows, however, that many outlets can be provided without difficulty in my apparatus, and the only difficulty in separating any number of fluids is the purely operating one of adjusting the throttle on each outlet so that it will discharge when running full neither more or less than the exact amount of that particular constituent which may be present.

The fact that my apparatus has two well defined regions in the fluid within it, one of which tends to collect the heavier portion and the other tending to collect the lighter portions, together with the fact that both inlet and discharge of both of these regions is accessible, as in Fig. 7, makes my apparatus unusually flexible in application to many industrial processes.

It is obviously possible with this flexibility to use the apparatus for many kinds of process involving the addition of either a solid or fluid, and a subsequent separation. For instance, a dense disinfectant can be continuously circulated in my apparatus, thus coming in contact with another fluid, such as drinking water, from which the disinfectant can be separated for recirculation, while the water would be discharged thoroughly disinfected. For instance, in Fig. 7, copper sulphate solution could be supplied at $14^b$ and water at $14^a$, and the copper sulphate would be discharged for recirculation at $15^a$ and the purified water at $15^b$.

In Figs. 10 and 11, I have shown an apparatus combining some of the structural advantages of Fig. 5 with certain of the operating features described in connection with Figs. 6 and 7; also in Figs. 12 and 13 I have shown driving means primarily designed for the device of Figs. 10 and 11, but usable in connection with many of the other forms.

The device of Figs. 10 and 11 is a special model filter designed to develop centrifugal forces of the order of two hundred thousand times gravity against the Sharples supercentrifuge, sold by the Westinghouse Electric and Mfg. Co., developing about 15,000 times gravity, which is described as the "highest commercially obtainable".

The present model may be driven from the armature shaft 51 of a quarter horse power series motor, not shown, operating at approximately 6,000 R. P. M. Two jack shafts, 52, 53, are belt driven at 36,000 R. P. M. and these shafts in turn are belted to drive the filter spindle, 54, at approximately 200,000 R. P. M. The arrangement of the belts as shown, is designed to balance the belt pull on the high speed spindle, thus avoiding friction. Another purpose of the unusual arrangement is to avoid the effect of centrifugal force upon the belt, in cutting down the arc of the contact between belt and spindle.

The device consists essentially of an outside case, 43, having suitable openings to which rubber tubes can be connected by the tube tips, 41, or which can be closed by the plugs, 42. The outer casing is closed at the ends by the plugs 46 and 48, which have openings which allow air to enter freely as far as the spindle 49 at its two bearings in the discs 47. These bearings are centered in the two parts 44 and 45, which are the true filter casing.

The supply end of the device is the spindle extension end. Fluid to be treated enters a small annular chamber formed by parts 44, 47 and 49, and is caught by a thread in the bore of part 44 and is thus pumped under pressure to a central annular chamber bounded by parts 44, 45 and 49, whence it flows in a thin film between parts 45 and 49. Any dense material entering this film is thrown outward into a thread cut in the bore of 45 in a manner to return the dense material to the central chamber, whence it can be removed by suitable tube connections.

It will be noted that liquid first meets the rotor at its largest diameter. Centrifugal force prevents its flowing outward between the rotor 49 and the bearings 47. This is because a film of .002 inch radial dimension would exert radial centrifugal force of about one atmosphere at the designed speed of operation. Since the decrease in rotor radius is about 62 thousandths inch the fluid in the apparatus must be subjected to something like thirty atmospheres before it can leak through the bearings. In this way the use of stuffing boxes is eliminated.

Some idea of the concentration of energy in this model may be gained from the following facts. The diameter of the rotor is one-half inch. Its surface speed is approximately 450 feet per second. The film around the rotor is .0015 inch thick. A rotor of this size, in an ordinary sleeve bearing, three inches long, lubricated by a water film of the same thickness would require approximately 2.5 horse power to overcome the shearing friction in the film, and the volume of the film would be about seven one-thousandths of a cubic inch. In other words, this model utilizes approximately 350 horse power per cubic inch of fluid under treatment, at the thin points of the filter film, when the film has the viscosity of water.

The actual power required to drive this model has been cut down by shortening the length of the thin film and by the use of threads about 12.5 thousandths inch deep. The calculated power consumption in the filter film in this model has thus been reduced to about .065 horse power, which does not include any bearing friction, or power consumed anywhere but in the fluid under treatment.

The difficulty of providing a lubricated bearing at each end of the spindle which would not consume more power than the filter itself, has been met in this particular model by using a hardened polished rotor, 49, turning in a hardened and polished steel disc. The bearings obviously must have practically negligible clearance from the shaft in order to maintain a uniform film for filtering. With such small clearances as are required, the internal friction in an oil film is necessarily excessive with the enormous speeds used in this model. Consequently, an absolutely dry bearing is used to cut down friction.

In a design for more moderate centrifugal effect, say, 20,000 to 50,000 gravity, it is obvious that the bearing problem would be much more simple. In some cases the rotor could be made to float in the filter film itself, without any bearings. In the present case this was not possible because of the power available, which prevented using a long film. In other cases, the viscosity of the fluids to be treated will allow much greater thickness of filter film, which will make the problem of bearing alignment much simpler. In other cases, the reduction of rotor speed, consequent upon developing smaller centrifugal forces, allows the use of a thicker filter film without exceeding the critical velocity at which eddies are formed. Finally, in the present design, the filter film was made about one-half as thick as it could be made without the formation of eddies at 200,000 R. P. M. in order to allow the filter to be used on gases and fluids less viscous than water. Hence, it is obvious that the construction of very large machines, suitable for handling thousands of gallons per day and subjecting them to centrifugal forces higher than is at present commercially practical, presents no mechanical difficulties.

It is characteristic of all the above forms of my apparatus, that when the fluid close to the rotor is once cleaned or purified by centrifugal force, which will be within a few seconds after starting, no impurities can thereafter pass to the discharge port without passing through successive layers of fluid having progressively increasing or decreasing velocities. It has been found by experiment, and can be shown by theory, that such reverse mixing does not happen because a film of fluid subject to rapid shearing without eddies, offers great resistance to the passage of suspended particles through the shearing surfaces. Hence, in some respects, my apparatus may be regarded as embodying a new kind of filter in which the filtering medium, instead of being a fabric, is a film of fluid subject to shear.

An apparatus in which this filtering function is quite divorced from centrifugal functioning, is shown in Figs. 8 and 9, in which the liquid is forced to cross a shearing film. The essentials of this particular embodiment are shown as comprising parallel circular discs 31, 32, spaced apart so as to define a thin film or layer of liquid between them. The discs have registering circular slots 33, 34, the liquid to be filtered being supplied under pressure through the inlet 2, and slots 33, and the filtrate being removed through slots 34 and outlet 3. The slots are preferably very narrow. Any fluid that gets across from disc 31 to disc 32 must traverse the film or layer between the discs. The shearing action on this film is produced by relative rotation of the discs about their common axis. While centrifugal forces will be negligible factors of the filtering, even if the discs are rotated in opposite directions, the case may be made simple by supposing the disc 31 to remain stationary and the fluid therein without rotary motion, while the disc 32 is rotated at high speed. It is evident that any fluid which is forced through the intermediate film and reaches the outlet openings 34 in disc 32, will have been subjected to a most violent shearing action and the thinner the film between 31 and 32 and the higher the speed of rotation of 32, the more enormous will be the rate of change of velocity of the fluid that passes through the film.

For purposes of illustration, we may assume that disc 32 is rotating at a speed of 1,000 revolutions per minute; that the semi-circular slots have a mean radius of one inch from the axis of rotation; and that the separation of the discs is .002 inch. Then the circumferential velocity, or the linear velocity around the axis, at the opening, figures out 8.74 feet per second, which is less than one-fiftieth of the relative velocity which might be used with the given film thickness (assuming the film is water) before exceeding the critical point where eddies are formed.

If the supply pressure forces the fluid through the film .002 inch thick, at a speed of 10 feet per second, it passes through in .0000167 second, and in this period must change its velocity around the circumference, by 8.74 feet per second. The rate of acceleration in undergoing this change of velocity is obviously 8.74 divided by .0000167 or 522,000 feet per second per second. Since the force required to produce acceleration is proportional to the acceleration, and since the acceleration of gravity is, say 32.2 feet per second per second, the change in circumferential velocity can only be produced by a force 522,000 divided by 32.2 or 16,200 pounds to accelerate one pound 522,000 feet per second per second.

Now, when a suspended particle of solid matter enters the apparatus, it is surrounded by fluid with respect to which the particle is, if comparatively small, necessarily at rest or nearly so. As the suspending fluid moves forward, it meets the shearing film and coalesces with it, is subjected to shear, and in passing through the shearing film assumes successively the velocity of each layer of the film of which it is a part, or in other words is accelerated in a tangential direction, until it passes into the opening of the second chamber, substantially at rest with respect to that member's rotation about the axis. The solid particle suspended in the fluid, and initially at rest with respect to it, is obviously carried along until it begins to project into the shearing film, at which point the portion of the particle immersed in the shearing film is no longer at rest with respect to the fluid, and cannot become so without changing its linear velocity around the axis. The acceleration required to change the velocity by the required amount would require a force, as shown in the last paragraph, amounting to 16,200 times the weight of the particle. In other words, the front of the particle, projecting into the shearing film, will be subjected to relatively enormous impact forces from the relatively moving fluid. The necessary deflection of this fluid, in passing around the particle, obviously will produce pressures tending to push the particle back out of the film, just as a tennis ball thrown into (and across) the jet of water from the garden hose, rebounds from the impact of the water.

Assuming that inertia actually carries the particle wholly into the shearing film, and that it actually acquires a change in velocity around the circumference as will ordinarily be the case, it will soon come to a velocity which is the same as the fluid layer passing substantially through its center, while in front and behind it are layers of fluid moving in relatively opposite directions with respect to the layer in which it floats. These layers tend by impact, to prevent the particle entering either. The particle is held substantially stationary, as regards motion along the axis. In other words, the shearing film acts upon a particle immersed in it to oppose motion in either direction through the shearing surfaces.

As soon as the particle touches the shearing film, and especially after becoming wholly immersed in it, the particle is subjected to rotational effects. It starts to roll between the relatively moving layers, as a ball rotates in a ball bearing. If the particle were smooth and without friction, little or no fluid would rotate with it. But the surface of the particle is necessarily covered, as any other rigid surface, by a thin film of fluid which moves with the surface, and this film is in turn covered by another film moving or shearing with respect to the first, and so on. When the suspending fluid moves with respect to the particle, the particle is surrounded by lines of shear through which the frictional force due to the relative motion is transmitted. If this were not so, the impact effects which prevent the passage of the particle transversely through the shearing film, would be largely neutralized as soon as the particle attained a certain rotative speed about an axis parallel with the shearing film. But the rotation of the particle rotates the layers of fluid about it, to a greater or less degree, depending on their distance from the particle, and these layers introduce, or rather form, local currents which at two points in their circumference are parallel with the axis of the apparatus, that is, perpendicular to the shearing film. It can be shown that these films of fluid rotating with the particle not only increase the apparent or effective size and weight of the particle, thus making its passage through the shearing film more difficult, but also tend to produce the same result by producing localized hydrostatic pressures which largely neutralize the reduction of impact when the particle starts to rotate. Further analysis shows that the shearing film has a very appreciable effect when the things to be separated have either different viscosities (as a solid and a liquid) or different densities which would affect the ease with which they changed velocity.

These reactions all tend to prevent a solid particle from entering or, after entering, from passing through, a shearing layer. It is clear that this discussion applies to the shearing film, however produced. It also obviously applies when, instead of the solid particle, a small mass of immiscible fluid floats in the carrying fluid, as in the case of emulsions. It also applies when the carrying fluid is a gas, and also, though not in every respect, to the action of the shearing film upon mixtures of fluids, either gaseous or liquid, which differ in density or viscosity. The enormous forces involved do not necessarily prohibit practical operation, because the total volume of the shearing film, which is the only matter subjected to acceleration, amounts only to about eight one-thousandths of a cubic inch. The weight accelerated is therefore small, and the torque necessary to apply the force can easily be applied by ordinary mechanical methods. It is obvious that the velocity of flow axially, across the film, may be greatly reduced, say, to an inch a second instead of ten feet, while still leaving the accelerating force much larger than the force of gravity or the effective centrifugal force. Similarly, the width of the ports may be greatly reduced without affecting the magnitude of the effects at all, while allowing less residue to enter the discharge member. The figures were given merely to show magnitudes. As in all cases, they are subject to wide variations to fit particular filtering problems.

Actually, the supply of fluid must be larger than the discharge of filtered fluid, because some carries off the residue at the periphery of the shearing film. With the dimensions here discussed, and using engine oil for fluid, this discharge would hardly take place from the centrifugal forces developed. But there will always exist outward flow for the same reason that flour passes out at the edge of the millstone—its motion between the stones is tangential and not circular and it moves outward in a spiral. It is therefore only necessary for the shearing film to retard the passage of solid particles until they pass radially outward beyond the edge of the port in the rotating member 32 of Fig. 8.

It can be seen that Fig. 8 falls in line with the other embodiments, say, Fig. 6, very simply, and can be described in operation in the same words except for two facts: the pump action in Fig. 6 is due to the screw thread, while that in Fig. 8 is partly an independent external source of pressure, and it is only the residue discharge that is pumped by the combination of centrifugal force and the spiral rolling action on the fluid in the film; secondly, the form of Fig. 8 stops all solids, whether lighter or heavier than the carrier fluid, while the form of Fig. 6 stops only solids as are more dense than the carrier fluid; because in Fig. 6 centrifugal force is the principal separating force, while in Fig. 8 the shearing fluid is the principal separating influence.

In both Fig. 6 and Fig. 8, there are two relatively moving surfaces separated by a film of substantially uniform thickness (where the filtering takes place). In both cases the supply enters through an opening in one surface and is prevented from approaching the other and going out through the filtered discharge before being purified by the necessity of passing through a film subject to shear. In both there is a scraper or deflector which separates the discharge containing the separated material from the other discharge. In Fig. 6 it separates the chambers 15 and $15^x$, while in Fig. 8 it is the outer rim of the rotating member 32. In both cases the shearing film must be penetrated if residue is to pass. In both cases such centrifugal force as is developed aids the shearing film: in Fig. 6 by removing material from the film perpendicular to its face, backward toward the face by which it entered the film; in Fig. 8 by carrying the film and any solids imbedded in it radially outward so that they cannot discharge with the clarified fluids.

I have discussed in great detail what seem to me to be the correct mechanical theories of the phenomena and methods utilized by my invention and have given illustrative numerical data with reference to the same, but this is because I am the first to utilize these phenomena for the purposes above set forth and even though some of my theories or figures may be inaccurate or erroneous, they are likely to be of great assistance to one skilled in the art, in seeking to embody my principles in specifically different apparatus for specifically different purposes. The utility of my invention is not dependent on the correctness of my theories or figures and for many purposes it will be quite sufficient to know that a rotor in contact with a body of liquid in a stationary container, can be used as a remarkably efficient centrifugal separator for a layer of the liquid adjacent the rotor and no knowledge of theory is required for utilizing my various expedients for separately withdrawing the various constituents.

I claim:

1. A method of separation for fluid mixtures containing unlike materials, which includes rotating one region of the mixture relative to an adjacent region by surface traction parallel with the direction of movement, substantially without producing eddies to develop different centrifugal separating pressures in successive adjacent regions of the mixture, and separately removing from one of said regions, material separated by said different centrifugal pressures.

2. A method of separation for fluid mixtures containing unlike materials, which includes rotating one region of the mixture relative to an adjacent region by surface traction parallel with the direction of movement, substantially without producing eddies to develop different centrifugal separating pressures in successive adjacent regions of the mixture, and separately removing from one of said regions where the centrifugal pressures are greater, material separated by said different centrifugal pressures.

3. A method of separation for fluid mixtures containing unlike materials, which includes rotating one region of the mixture relative to an adjacent region by surface traction parallel with the direction of movement, substantially without producing eddies to develop different centrifugal separating pressures in successive adjacent regions of the mixture and to establish slip or shear between adjacent laminæ, and removing separated material from one of said regions.

4. A method of separation for fluid mixtures containing unlike materials, which includes rotating one region of the mixture relative to an adjacent region by surface traction parallel with the direction of movement, substantially without producing eddies to develop different centrifugal separating pressures in successive adjacent regions of the mixture and to establish slip or shear between adjacent laminæ, and removing separated material from regions where the centrifugal pressures are greater.

5. A method of separation for fluid mixtures containing unlike materials, which includes rotating one region of the mixture relative to an adjacent region by surface traction parallel with the direction of movement, substantially without producing eddies to establish slip or shear between adjacent laminæ or layers; applying pressures to force differential or selective movements of the material across said laminæ and removing separated material from one of said regions.

6. A method of separating a liquid from mixture with solids, which includes rotating a surface immersed in the liquid in one region of the mxture relative to an immersed surface in an adjacent region by surface traction parallel with the direction of movement, substantially without producing eddies, thereby to develop different centrifugal separating pressures in successive adjacent regions of the mixture and separately removing material from adjacent said surfaces.

7. A method of separating a liquid from mixture with solids, which includes rotating a surface immersed in the liquid in one region of the mixture relative to an immersed surface in an adjacent region by surface traction parallel with the direction of movement, substantially without producing eddies, thereby to develop different centrifugal separating pressures in successive adjacent regions of the mixture and removing separated material from adjacent surfaces where the centrifugal pressure is greater.

8. A method of separating a fluid from mixture with solids, which includes rotating one region of the mixture relative to an adjacent region, by traction of relatively rotating surfaces immersed in the mixture, thereby establishing slip or shear between adjacent laminæ or layers, of the mixture with correspondingly different centrifugal pressures; and separately removing material from adjacent said surfaces.

9. A method of separating a fluid from mixture with solids, which includes rotating in a relatively stationary body of mixture, a rotor surface immersed in the fluid, thereby to apply traction upon the mixture to develop centrifugal force and to establish slip or shear between adjacent laminæ or layers about the axis of the rotor; and removing separated material from adjacent the surface of said rotor.

10. A method of separating a fluid from mixture with solids, which includes rotating a surface immersed in the fluid in one region of the mixture relative to an immersed surface in an adjacent region, thereby to apply traction upon the intermediate portion of the mixture to establish slip or shear between adjacent laminæ or layers; applying pressures to force differential or selective movements of the material across said laminæ and separately removing material from said adjacent laminæ or layers.

11. A method of separating a fluid from mixture with solids, which includes immersing coaxial circular surfaces in the mixture, forming a layer or film of the fluid thereon by relatively rotating said surfaces about their axis to drag along, rotate and centrifugally project the heavier constituent from the lighter films or layers, and then separately collecting constituents from said layers.

12. A method of separating a liquid from mixture with solids, which includes immersing coaxial circular surfaces in the mixture, relatively rotating said surfaces about their axis to drag along, rotate and centrifugally project the heavier constituent from adjacent films or layers, causing at least one of the separated layers to progress along the adjacent surface while scraping back and preventing progress of the mixture and then collecting liquid from said layer.

13. A method of separating a fluid from mixture with solids, which includes immersing a screw-threaded cylindrical surface in the mixture, rotating the surface relatively to the mixture to drag along, rotate and centrifugally project matter from adjacent films or layers; causing said adjacent layers to progress along said surface; freeing them from the mixture by scraping back and preventing progress of the mixture; and collecting the thus removed fluid.

14. A method of separating a liquid from mixture with solids, which includes immersing screw-threaded, relatively rotating coaxial surfaces in a body of the mixture maintained between them, relatively rotating said surfaces to drag along, rotate and centrifugally project heavier matter toward the outer surface, causing adjacent layers to progress along one of said surfaces while the other screw-thread gages the layers adjacent said surface, and causes layers adjacent itself, to progress in the opposite direction; and separately collecting the said layers.

15. The method which includes rotating a shaft having its surfaces substantially concentric and lying parallel with the direction of rotation at high speed in a body of fluid mixed with matter of different density or viscosity to differently project components of the mixture in a radial direction with respect to said shaft, and utilizing the separating effect thereby produced.

16. The method which includes rotating a shaft having its surfaces substantially concentric and lying parallel with the direction of rotation at high speed in a body of fluid mixed with matter of different density or viscosity to differently concentrate components of the mixture at different radial distances from said shaft and separately removing components so concentrated, and utilizing the separating effect thereby produced.

17. Apparatus for separating a fluid from mixture with solids, which includes means for rotating one region of the mixture relative to an adjacent region, by oppositely applied traction between relatively rotating surfaces immersed in the mixture, thereby establishing slip or shear substantially without eddies between adjacent laminæ or layers of the mixture with correspondingly different centrifugal pressures; and means for removing separated material from adjacent one of said surfaces.

18. Apparatus for separating a fluid from mixture with solids, which includes rotating in a relatively stationary body of mixture, a rotor having a surface immersed in the fluid, thereby to apply traction upon the mixture to develop centrifugal force and to establish slip or shear substantially without eddies between adjacent laminæ or layers about the axis of the rotor; and means for removing separated material from adjacent the surface of said rotor.

19. Apparatus for separating a fluid from mixture with solids, which includes means for rotating a body having a surface immersed in the fluid in one region of the mixture relative to an immersed surface in an adjacent region, thereby to apply traction upon the intermediate portion of the mixture to establish slip or shear substantially without eddying between adjacent laminæ or layers; means for forcing differential or selective movements of the material constituents of the mixture across said laminæ and means for removing concentrated material from adjacent one of said surfaces.

20. Apparatus for separating a fluid from mixture with solids, which includes a member having a surface immersed in the mixture to form a solid-free film or layer of the fluid, means for progressively moving said film along said surface to a collecting point or region, and gaging scraper means to restrain the unseparated mixture from progressing with said film.

21. Apparatus for separating a fluid from mixture with solids, which includes members having coaxial circular surfaces in contact with the fluid in a body of mixture between them, means for rotating one of said members about their common axis to drag along, rotate and centrifugally project solid matter from one of said members toward the other substantially without causing eddies, and then separately removing fluid from said layers.

22. Apparatus for separating a fluid from mixture with solids, which includes outer and inner members having coaxial circular surfaces, in contact with an intermediate body of the mixture, means for rotating the inner member about its axis to drag along, rotate and centrifugally project solid matter from adjacent films or layers, means for causing said layer to progress with respect to adjacent surfaces, gaging scraper means for preventing progress of unseparated mixture along with said layer, and means for collecting fluid from said layers.

23. Apparatus for separating fluid from mixture with solids, which includes a member having a screw-threaded cylindrical surface immersed in the mixture, means for rotating said member to drag along, rotate and centrifugally project matter from adjacent surrounding films or layers, the direction of rotation and drag being such as to cause said layer to progress along said screw-thread surface; gaging and deflecting means for freeing said layer from the mixture by scraping back and preventing progress of the mixed layers; and means for collecting the thus removed fluid.

24. Apparatus for separating from a fluid mixture constituents of different specific gravities or viscosities, which includes screw-threaded, relatively rotating coaxial members the surfaces of which are in contact with a body of the fluid maintained between them, means for rotating said members to drag along, rotate and centrifugally project matter from adjacent films or layers, said parts being designed and operated to cause said layers to progress in opposite directions along the respective surfaces while the opposite screw-threads gage the thickness of said progressing layers; and separately collecting the thus separated fluid layers.

Signed at New York, in the county of New York, and State of New York, this 13th day of October, A. D. 1925.

WILFRED T. BIRDSALL.